US007298782B2

(12) United States Patent
Kuriakin et al.

(10) Patent No.: US 7,298,782 B2
(45) Date of Patent: Nov. 20, 2007

(54) METHOD AND APPARATUS FOR IMPROVED MEMORY MANAGEMENT OF VIDEO IMAGES

(75) Inventors: Valery Kuriakin, Nizhny Novgorod (RU); Alexander Knyazev, Nizhny Novgorod (RU); Roman Belenov, Nizhny Novgorod (RU); Yen-Kuang Chen, Franklin Park, NJ (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 10/355,704

(22) Filed: Jan. 31, 2003

(65) Prior Publication Data
US 2003/0151610 A1 Aug. 14, 2003

Related U.S. Application Data

(62) Division of application No. 09/607,825, filed on Jun. 30, 2000, now Pat. No. 6,961,063.

(51) Int. Cl.
*H04N 7/12* (2006.01)
(52) U.S. Cl. .................................. 375/240.26
(58) Field of Classification Search ................ 348/420, 348/413, 402, 421, 416, 400, 699, 405.1, 348/419.1, 424, 441, 425, 453, 449; 382/107, 382/235, 234, 238, 244; 386/109, 111; 375/240.03, 375/240.21, 240.26, 240.25
See application file for complete search history.

(56) References Cited

U.S. PATENT DOCUMENTS 5,561,780 A * 10/1996 Glew et al. ................. 711/126
5,907,500 A    5/1999 Nadehara
6,078,690 A    6/2000 Yamada et al.
6,208,350 B1   3/2001 Herrera
6,259,741 B1   7/2001 Chen et al.
6,326,984 B1 * 12/2001 Chow et al. ................. 715/764

(Continued)

OTHER PUBLICATIONS

Bilas, Angelos et al., *Real Time Parallel MPEG2 Decoding in Software*, Princeton Univ., Depts. of Comp. Sci and Elect. Eng., pp. 1-14, IPPS Apr. 1997.

Coelho, R. and Hawash, M., *DirectX, RDX, RSX and MMX Technology*, Chapter 22.10 Speed Up Graphics Writes with Write Combining, Addison-Wesley; Reading, MA., 1998, pp. 369-371.

(Continued)

*Primary Examiner*—Tung Vo
*Assistant Examiner*—Behrooz Senfi
(74) *Attorney, Agent, or Firm*—Blakely, Sokoloff, Taylor & Zafman LLP

(57) ABSTRACT

A novel storage format enabling a method for improved memory management of video images is described. The method includes receiving an image consisting of a plurality of color components. Once received, the plurality of color components is converted to a mixed format of planar format and packed format. The mixed packet format is implemented by storing one or more of the plurality of color components in a planar format and storing one or more of the plurality of color components in a packed format. A method for writing out video images is also described utilizing a write combining (WC) fame buffer. The decoding method motion compensates groups of macroblocks in order to eliminate partial writes from the WC frame buffer.

6 Claims, 15 Drawing Sheets

OTHER PUBLICATIONS

Bilas, Angelos et al., *Real Time Parallel MPEG 2 Decoding in Software*, Princeton Uiversity, Departments of Computer Science and Electrical Engineering, pp. 1-14.

Chapter 22.10 *Speed Up Graphics Writes with Write Combining*, pp. 369-371.

* cited by examiner

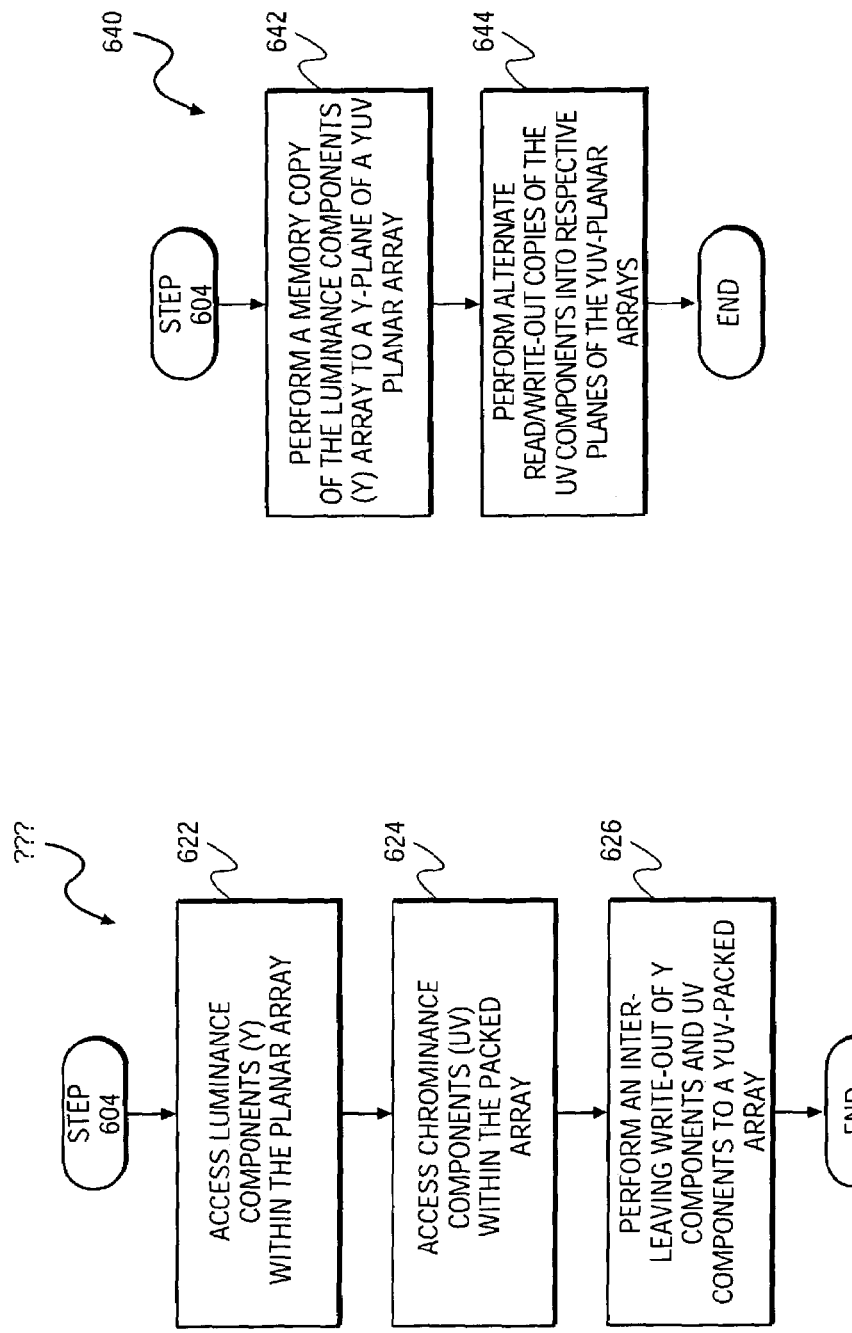

METHOD AND APPARATUS FOR IMPROVED MEMORY MANAGEMENT OF VIDEO IMAGES

The application is a divisional of U.S. patent application, Ser. No. 09/607,825, filed Jun. 30, 2000 now U.S. Pat. No. 6,961,063.

FIELD OF THE INVENTION

The present invention relates to video images, and, in particular, to a novel storage format for enabling improved memory management of video images.

BACKGROUND OF THE INVENTION

In accordance with the NTSC (National Television Standards Committee) and PAL (Phase Alternating Line) standard, video images are presented in the YUV color space. The Y signal represents a luminance value while the U and V signals represent color difference or chrominance values. YUV video image data may be transmitted in packed format or planar format. In packed format, all the data for a given set of pixels of the video image is transmitted before any data for another set of pixels is transmitted. As a result, in packed format, YUV data is interleaved in the transmitted pixel data stream 100, as depicted in FIG. 1 (YUY2 packed format). In planar format, Y, U and V data values are stored into separate Y, U and V memory areas (planes) in system memory 110, as depicted in FIG. 1B.

FIGS. 2A, 2B and 2C are diagrams illustrating three different formats for representing video images in the YUV color space. A video image frame may consist of three rectangular matrices representing the luminance Y and the two-chrominance values U and V. Y matrices 120, 130 and 140 have an even number of rows and columns. In YUV 4:2:0 color space format, chrominance component matrices 122 and 124 may be one half in size of Y matrix 120 in horizontal and vertical directions as depicted in FIG. 2A. In YUV 4:2:2 format, chrominance component matrices 132 and 134 may be one half in size of Y matrix 130 in the horizontal direction and the same size in the vertical direction as depicted in FIG. 2B. Finally, in YUV 4:4:4 format, chrominance component matrices 142 and 144 may be the same size as Y matrix 140 in the horizontal and vertical directions as depicted in FIG. 2C.

To store video data efficiently, conventional digital video systems contain a data compressor that compresses the video image data using compression techniques. Many conventional compression techniques are based on compressing the video image data by processing the different pixel components separately. For example, in accordance with Motion Picture Experts Group (MPEG) or International Telecommunications Union (ITU) video compression standards, a YUV-data compressor may encode the Y data independently of encoding U data and encoding V data. Such a compressor preferable receives video data in planar format, in which the Y, U, and V data for multiple pixels are separated and grouped together in three distinct data streams of Y only, U only and V only data, as described above (FIG. 1B).

Although planar format provides significant advantages for data compression, several disadvantages arise when storing or processing data received in planar format. For example, a video decoder that receives video image data in YUV planar format requires three pointers to the Y, U and V component values. For basic DVD (Digital Versatile Disk) and HDTV (High Definition Television) mode, each macroblock has three blocks of pixels: Y:16×16, U:8×8 and V:8×8. In addition, the U and V components are located in different memory locations. In terms of code size, three blocks of code are required for conventional motion compensation of the video image data. Moreover, a separate memory page usually must be opened for each YUV component.

In terms of cache efficiency, for YUV video in the 4:2:0 format (FIG. 2A), the useful area (in a cache line) for the Y-component is about sixteen-bytes per cache line. For the U and V components, the useful area is eight-bytes per line per color-component. Therefore, two rows in a macroblock potentially occupy four cache lines since the U and V components are vertically and horizontally sub-sampled in 4:2:0 format (two Y cache lines, one U cache line, and one V cache line). For YUV video in 4:2:2 format (FIG. 2B), six cache lines are required (2 Y cache lines, 2 U cache lines, and 2 V cache lines.) Although YUY2 packed format (FIG. 1A), as described above, uses only two cache lines and could be used to overcome this cache inefficiency problem, conventional motion compensation of data in YUY2 format is inefficient.

Therefore, there remains a need to overcome the limitations in the above described existing art, which is satisfied by the inventive structure and method described hereinafter.

BRIEF DESCRIPTION OF THE DRAWINGS

Additional features and advantages of the invention will be more apparent from the following detailed description and appended claims when taken in conjunction with the drawings, in which:

FIG. 14 illustrates additional method steps for improved memory management of video images utilizing a mixed storage format according to a further embodiment of the present invention.

FIG. 15 illustrates additional method steps for improved memory management of video images utilizing a mixed storage format according to a further embodiment of the present invention.

DETAILED DESCRIPTION

System Architecture

The present invention overcomes the problems in the existing art described above by providing a novel storage format enabling a method for improved memory management of video images. In the following detailed description, numerous specific details are set forth in order to provide a thorough understanding of the present invention. However, one having ordinary skill in the art should recognize that the invention may be practiced without these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In some instances, well-known structures, devices, and techniques have not been shown in detail to avoid obscuring the present invention.

Figure 1A:
FIG. 1A illustrates a video image data stream in YUV2 packed format as known in the art.
Figure 1B:
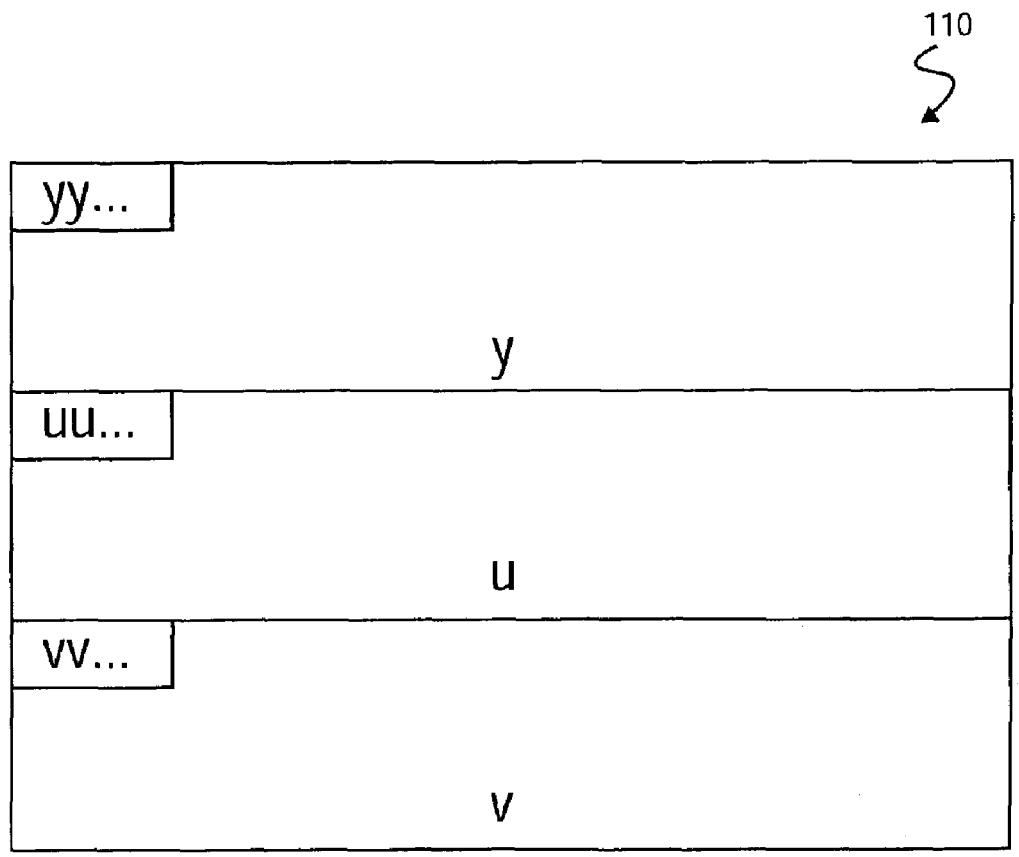
FIG. 1B illustrates video image data stored in YV12 pure planar format, as known in the art.
Figure 2A:
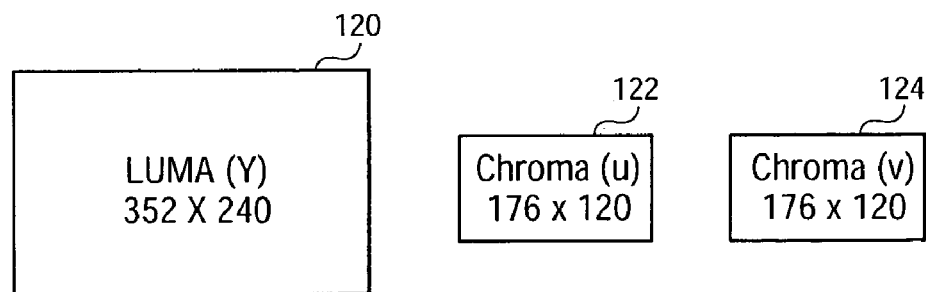
FIGS. 2A-C illustrate the YUV 4:2:0 color space format, the YUV 4:2:2 color space format and the YUV 4:4:4 color space format, as known in the art.
Figure 2B:
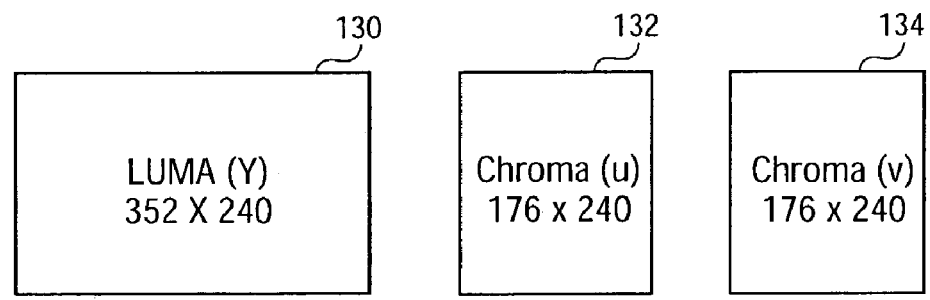
Figure 2C:
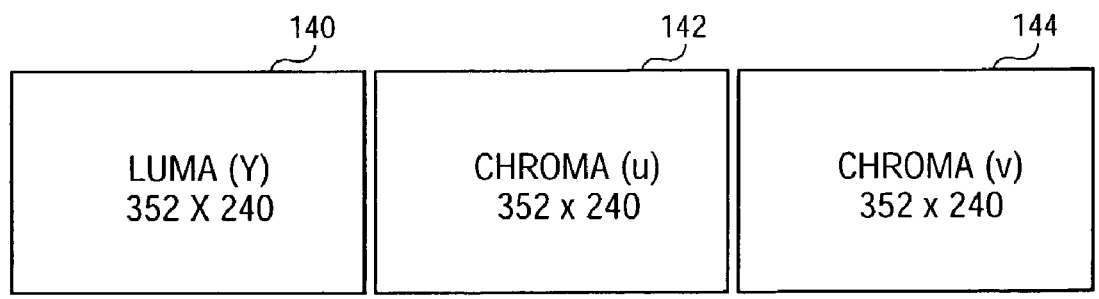
Figure 3:
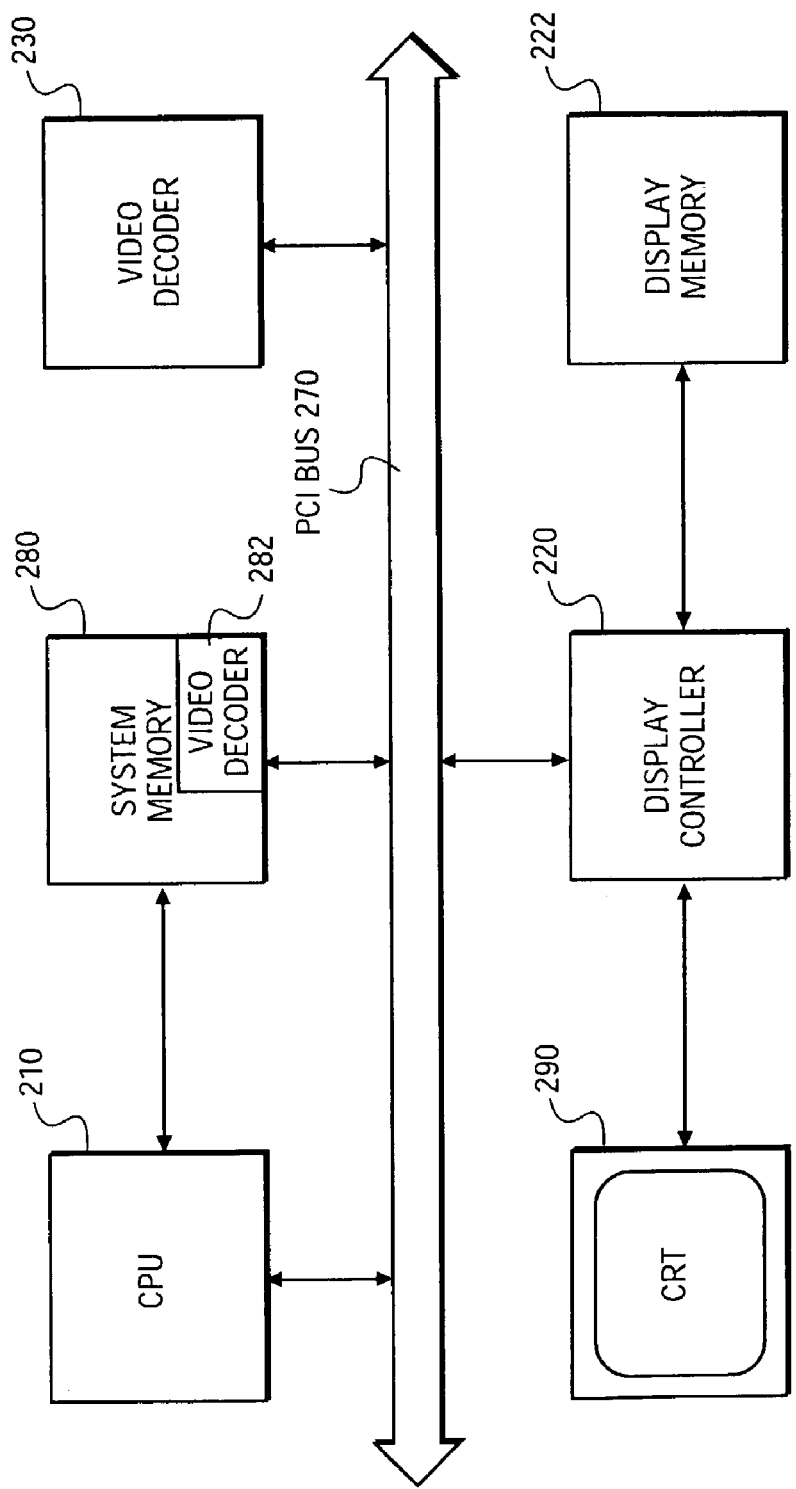
FIG. 3 illustrates a block diagram of a conventional computer system as known in the art.

Referring to FIG. 3, a block diagram illustrating major components of a computer system 200 in which the inventive storage format may be implemented is now described. The computer system 200 includes a display controller 220. The display controller 220 is, for example a Video Graphics Adapter (VGA), Super VGA (SVGA) or the like. Display controller 120 generates pixel data for display 290, which is, for example, a CRT, flat panel display or the like. The pixel data is generated at a rate characteristic of the refresh of display 290 (e.g., 60 Hz, 72 Hz, 75 Hz or the like) and horizontal and vertical resolution of a display image (e.g., 640×480 pixels, 1024×768 pixels, 800×600 or the like). Display controller 220 may generate a continuous stream of pixel data at the characteristic rate of display 290.

Display controller 220 is also provided with a display memory 222, which stores pixel data in text, graphics, or video modes for output to display 290. Host CPU 210 is be coupled to display controller 220 through bus 270 and updates the content of display memory 222 when a display image for display 290 is altered. Bus 270 may comprise, for example, a PCI bus or the like. System memory 280 may be coupled to Host CPU 210 for storing data. Hardware video decoder 230 is provided to decode video data such as, for example, MPEG video data. MPEG video data is received from an MPEG video data source (e.g., CD-ROM or the like). Alternatively, the video decoder 230 is implemented as, for example, a conventional software decoder 282 stored in the system memory 280. As such, one of ordinary skill in the art will recognize that the teaching of the present invention may be implemented in either software or hardware video decoders. Once decoded, the decoded video data is outputted to system memory 270 or directly to display memory 230.

Figure 4:
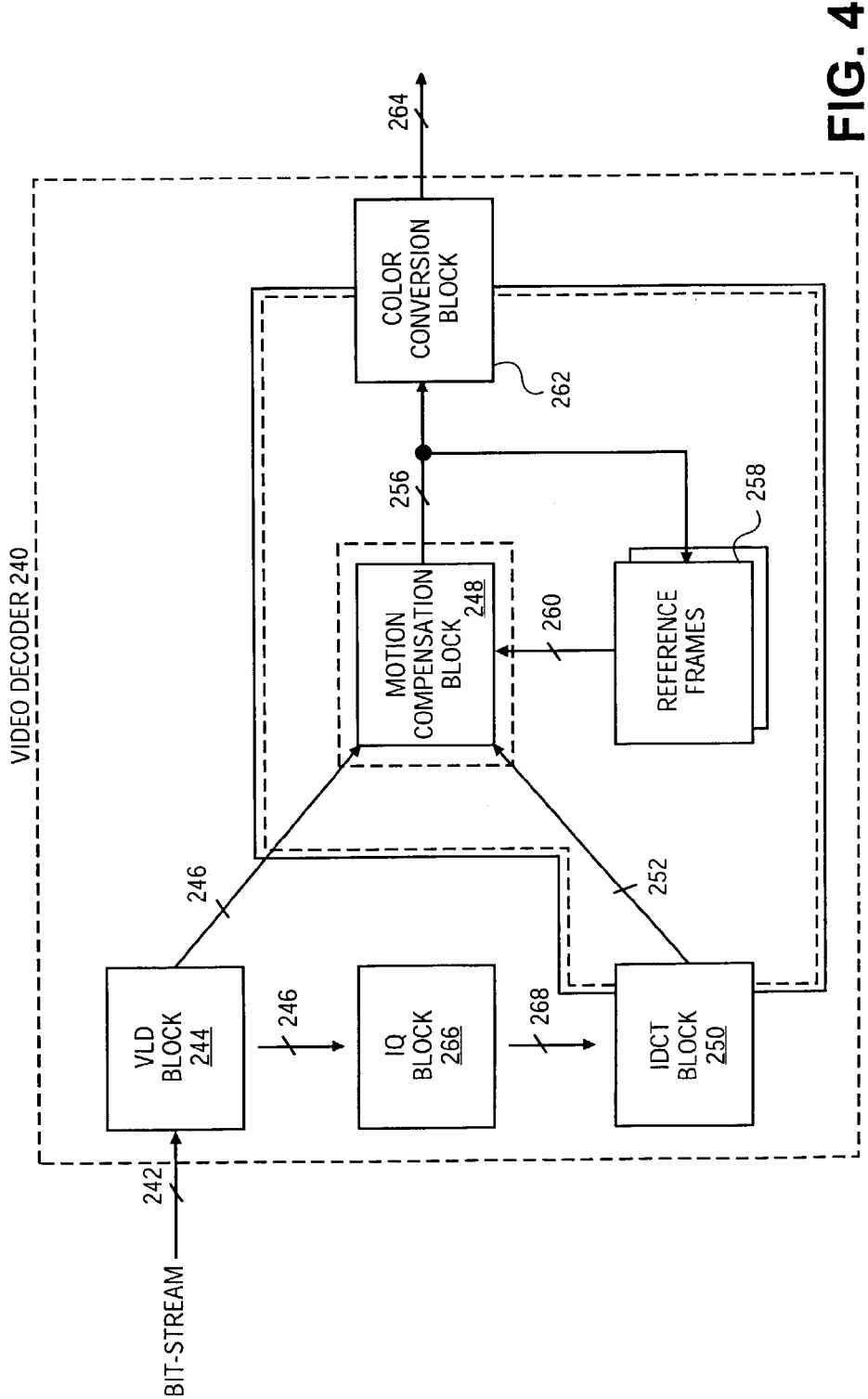
FIG. 4 is a block diagram illustrating a video decoder in accordance with one embodiment of the present invention.

Referring to FIG. 4, the components of a video decoder 240 according to a first embodiment of present invention are further described. The video decoder 240 may be utilized as the hardware decoder 230 or software decoder 282 within the computer system 200. MPEG data received from an MPEG data source may be decoded and decompressed as follows. The video decoder 240 receives an MPEG bit stream 242 at a Variable Length Decoding (VLD) block 244. The VLD block 244 decodes the MPEG bit stream 242 and generates a quanitized block 246 that is transferred to an Inverse Quantanization Block (IQ block) 266. The IQ block 266 performs inverse quantization on the quantized block 246 to generate a frequency spectrum 268 for the quantized block. An Inverse Discrete Cosine Transform (IDCT) block 246 performs inverse discrete cosine transformation of the quantized block 246 using the frequency spectrum 268 to generate a decoded block 252 that is transferred to the motion compensation block (MCB) 248. Motion compensation is performed by the MCB 248 to recreate the MPEG data 256. Finally, color conversion block 262 converts the MPEG data 256 into the Red, Green, Blue (RGB) color space in order to generate pictures 264.

Conventional MPEG decoders, such hardware video decoder 230 or software video decoder 282, decode a compressed MPEG bit stream into a storage format depending on the particular compression format used to encode the MPEG bit stream. For the reasons described above, YUV planar format is the preferred format for compression of MPEG images within conventional MPEG decoders. Consequently, the decoded block 252 outputted by the IDCT block 250 as well as the MPEG data 256 outputted by the MCB 254 are generated in YUV planar format within conventional MPEG decoders. Unfortunately, YUV planar format is an inefficient format during motion compensation of the decoded block 252.

Figures 5A, 5B, 5C:
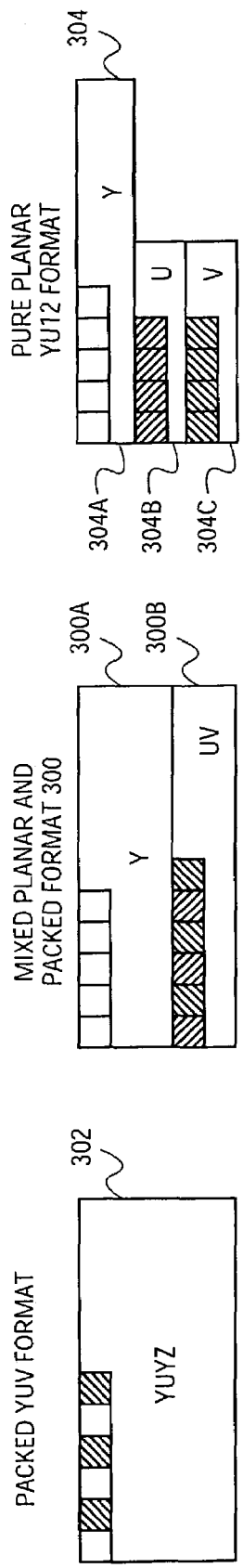
FIGS. 5A and 5B illustrate YUV color space storage formats as known in the art.
FIG. 5C illustrates a block diagram of a mixed storage format according to an exemplary embodiment of the present invention.

Accordingly, FIG. 5C depicts a novel mixed storage format 300 described by the present invention that is utilized by the video decoder 240. Careful review of FIGS. 5A-5C illustrates that Y component values are stored in a planar array 300A while the U and V components are interleaved in a packed array 300B. Using the mixed storage format 300, decoded block 252 received from the IDCT block 246 is converted from planar format (FIG. 5B) to the mixed storage format 300. Storage of reference frames 260 and MPEG data 256 in the mixed storage format 300 optimizes motion compensation of the decoded block 252 as depicted in FIGS. 6A and 6B.

Figures 6A, 6B:
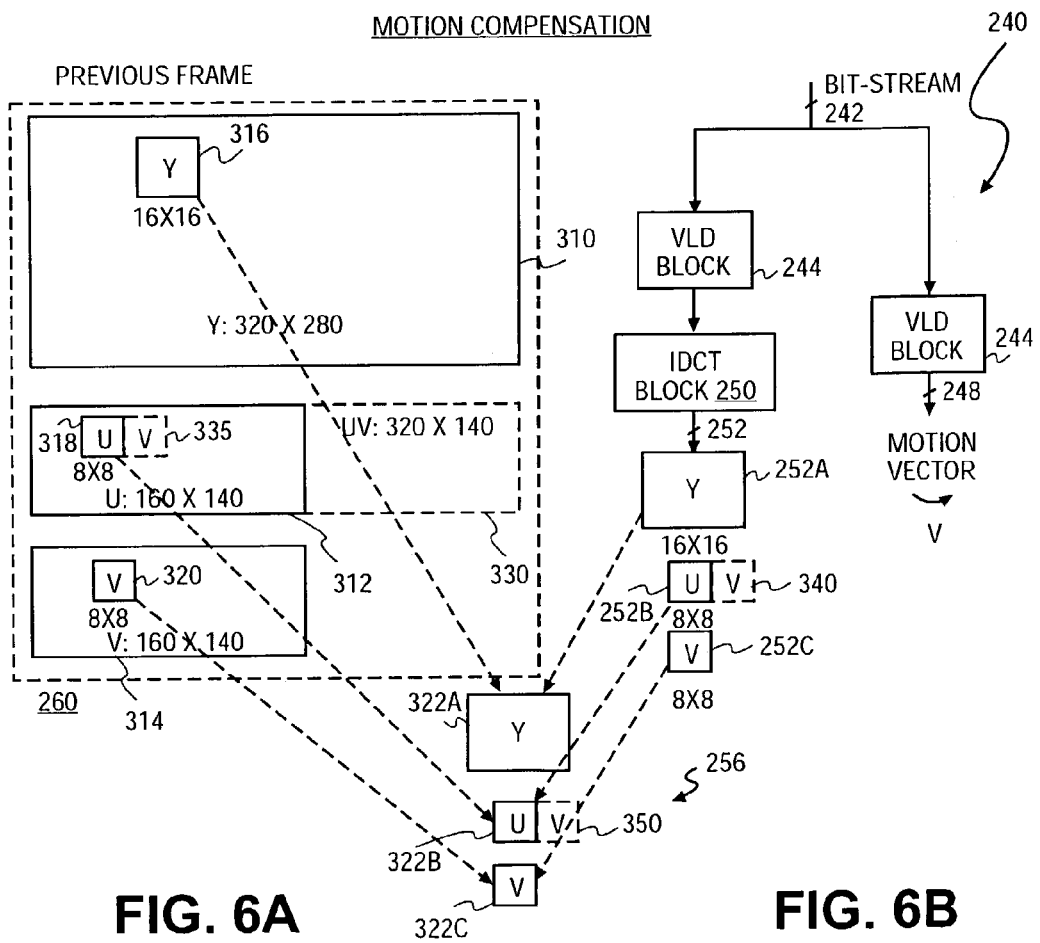
FIGS. 6A-6B illustrate motion compensation of decoded blocks according to a further embodiment of the present invention.

FIG. 6A depicts a previous frame 260 that is stored in a reference frames block 258. The previous frame 260 includes a 320×280 pixel Y-component 310, a 160×140 pixel U-component 312 and a 160×140 pixel V-component 314, represented in planar format 304 (FIG. 5B). FIG. 6B depicts a portion of the Video Decoder 240. Together FIGS.

6A and 6B depict the combination of the decoded block 252 (252A, 252B, and 252C) and corresponding YUV components, as determined by a motion vector (V) 248, of the previous frame 260 during motion compensation. During the decoding process, the VLD block 244 generates the motion vector (V) 248, which corresponds to the decoded block 252 generated by the IDCT Block 250. Referring again to FIGS. 6A and 6B, the motion vector (V) 248 identifies Y-block 316, U-block 318 and V-block 320 of the previous frame 260. In order to motion compensate the decoded block 252, Y data 252A is combined with Y-block 316, U data is combined with U-block 318 and V data is combined with V-block 320 in order to generate MPEG data 256 (322A, 322B and 322C).

However, if the previous frame 260 and the decoded block 252 are stored in the mixed storage format 300 (FIG. 5C), the motion compensation process is streamlined. Referring again to FIG. 6A, the previous frame can be stored in the mixed storage format 300 (FIG. 5C) as indicated by the 320×140 UV-component 330, such that a UV-block 335 is formed. Referring again to FIG. 6B, the decoded block can be stored in the mixed storage format 300 (FIG. 5B) as indicated by UV data 340. The UV-block 335 is then combined with the UV data 340 in order to generate UV-MPEG data 350.

Careful review of FIGS. 6A and 6B illustrates the advantages of using the mixed packed format 300 (FIG. 5C) during motion compensation. Motion compensation using the planar format 304 (FIG. 5B) requires (1) opening three memory pages, (2) using three pointers, and (3) performing three operations for each YUV component to motion compensate the decoded block 252. In contrast, motion compensation using the mixed storage format 300 (FIG. 5C) requires (1) opening two memory pages, (2) using two pointers, and (3) performing two operations for each Y and UV component to motion compensate the decoded block 252. In addition, referring again to FIGS. 6A and 6B, storage of YUV data in cache memory (not shown) requires thirty-two cache lines in planar format 304 (FIG. 5B) (eight-cache lines for the Y-component, eight cache lines for each U and V component). In contrast, storage of the Y and UV components in the mixed storage format 300 (FIG. 5C) requires twenty-four cache lines (sixteen cache lines for the Y-component and eight cache lines for the UV component).

Figure 7A:
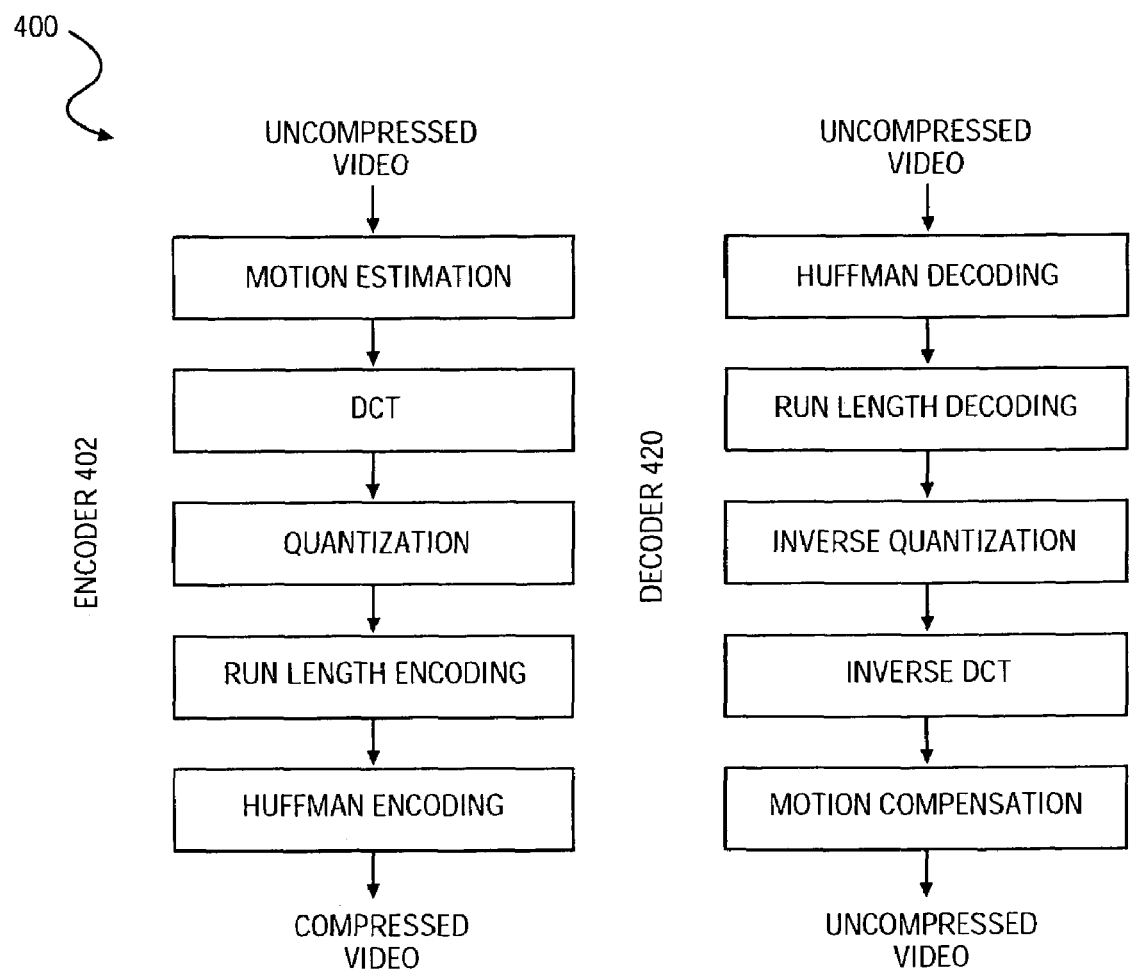
FIG. 7A is a block diagram illustrating steps for encoding and decoding MPEG image data as known in the art.
Figure 7B:
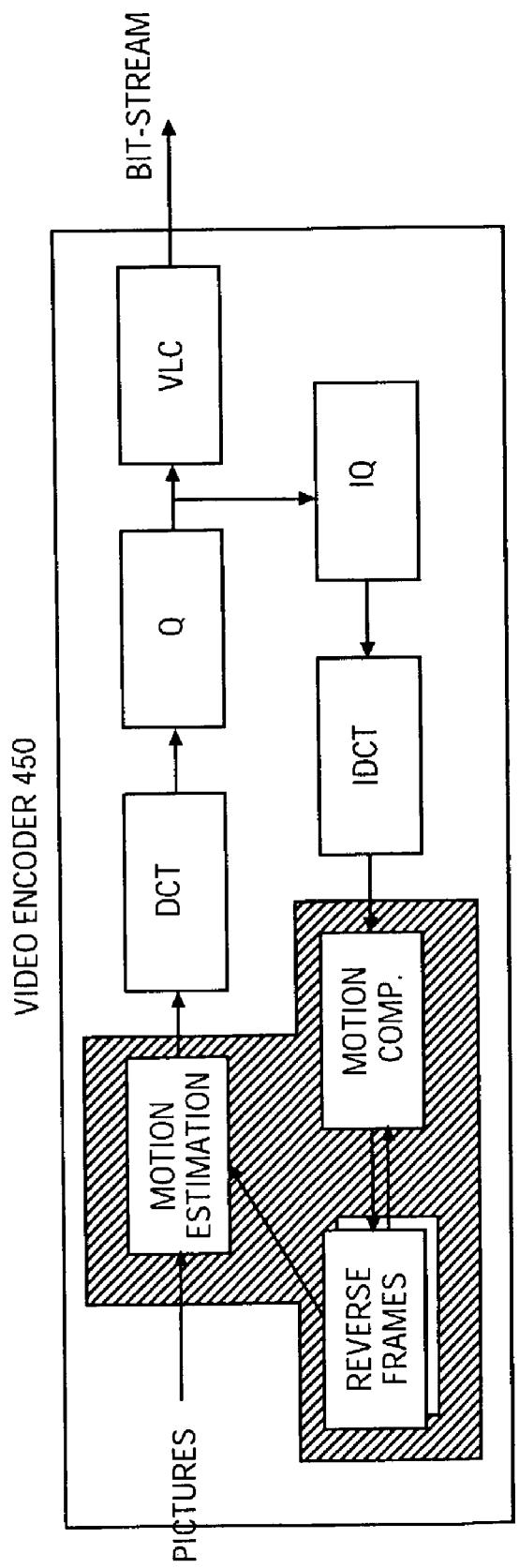
FIG. 7B is a block diagram illustrating a video encoder in accordance with a further embodiment of the invention.

Moreover, benefits from using of the mixed storage format 300 (FIG. 5C) are not limited to video decoders. FIG. 7A depicts the steps for encoding and decoding video images 400. Careful review of FIG. 7A illustrates that the encoding 402 and decoding 420 of video images essentially mirror each other. Consequently, referring to FIG. 7B, the mixed storage format may be used in a Video Encoder 450 during motion estimation 452, motion compensation 454 and storage of reference frames 456. For the reasons described above use of the mixed storage format 300 (FIG. 5C) will reduce hardware costs of the Video encoder (less pointers), and speed up the encoding process (less operations and memory access). In addition, cache line efficiency results from using the mixed storage format 300 (FIG. 5C), as described above.

Figure 8:
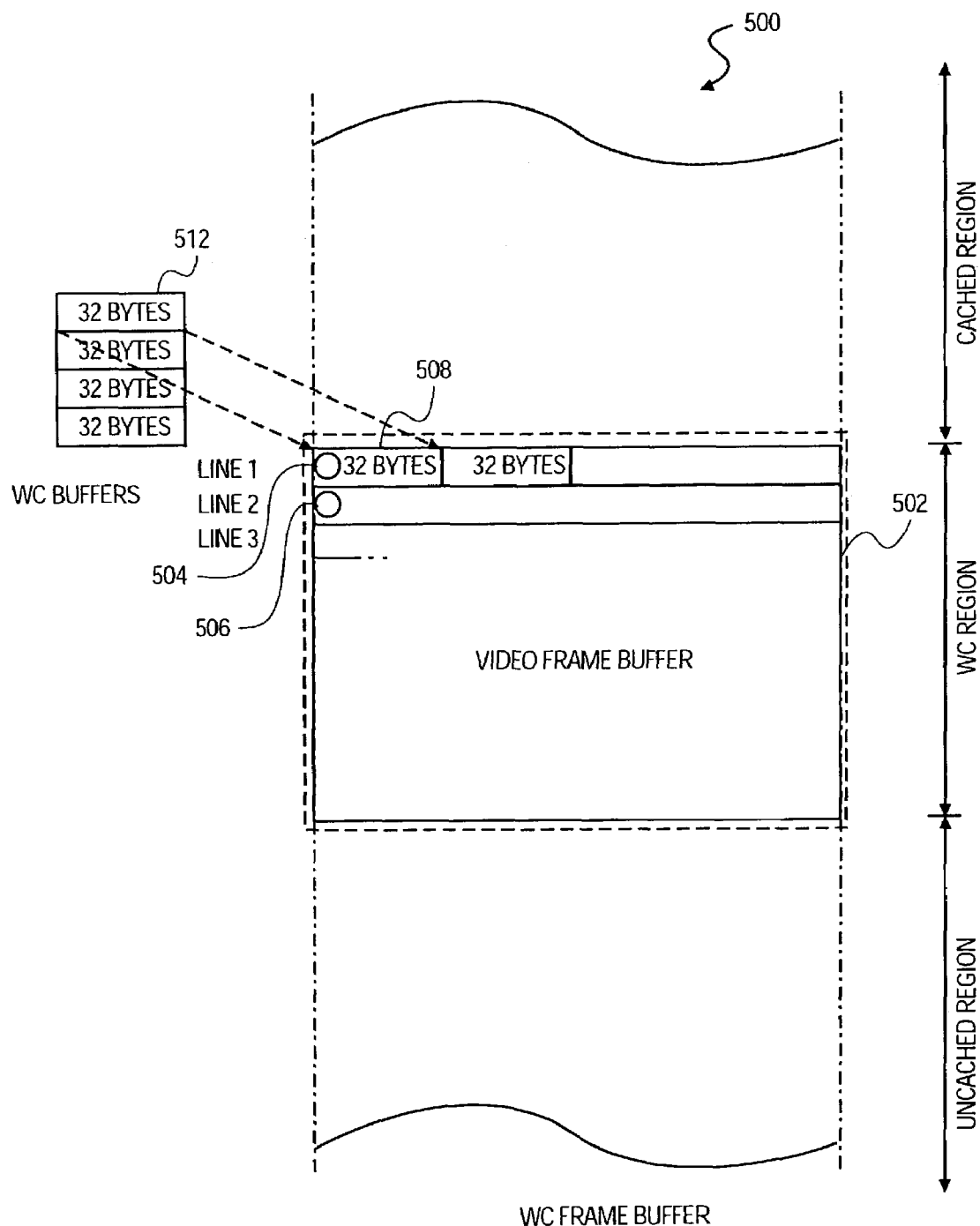
FIG. 8 is a block diagram illustrating a write combining (WC) buffer as known in the art.

Although use of the mixed storage format 300 (FIG. 5C) provides improved cache line efficiency, there remains a need to improve access speed to graphics memory. One technique for overcoming this problem is using a Write Combining (WC) buffer in order to accelerate writes to the video frame buffer, as depicted in FIG. 8. FIG. 8 depicts a memory address space 500 including a WC region 502. The WC buffer 512 utilizes the fact that thirty-two byte burst writes are faster than individual byte or word writes since burst writes consume less bandwidth from the system bus. Hence, applications can write thirty-two bytes of data to the WC frame buffer 512 before burst writing the data to its final destination 508.

Nonetheless, not all applications take advantage of WC buffers. One problem associated with WC buffers is that WC buffers generally contain only four or six entries in their WC region 502. Consequently, any memory stores to an address that is not included in the current WC buffer 512 will flush out one or some entry in the WC buffer 512. As a result, partial writes will occur and reduce the system performance.

However, by writing data sequentially and consecutively into the WC region 502 of the system memory 500, partial memory writes to the WC region 502 are eliminated. Referring again to FIG. 8, if we write the first pixel 504 in line one of an image, then the first pixel 506 in line two of the image, it is very likely that the WC buffer 512 (holding only one byte) will be flushed out. This occurs because we are writing to the WC region 502 in a vertical manner, such that the second write does not map to the same entry of the WC buffer 512. In contrast, when we write to the WC region 502 in a sequential and consecutive manner, the first thirty-two pixels 508 of line one of the image may be written to the WC buffer 512 before the first thirty-two bytes of pixels 508 are burst written to their final destination in the WC region 502. Once we completely write the thirty-second pixel byte 508 in the WC buffer 512, the entire thirty-two bytes of pixels 508 can be burst written to their final destination.

In MPEG video decoding, it is important to reduce partial writes during motion compensation and during frame output to graphics memory. A novel method for re-ordering of operations during motion compensation of video frames in order to reduce partial writes is now described with reference to FIG. 9 and FIG. 10.

Figure 9:
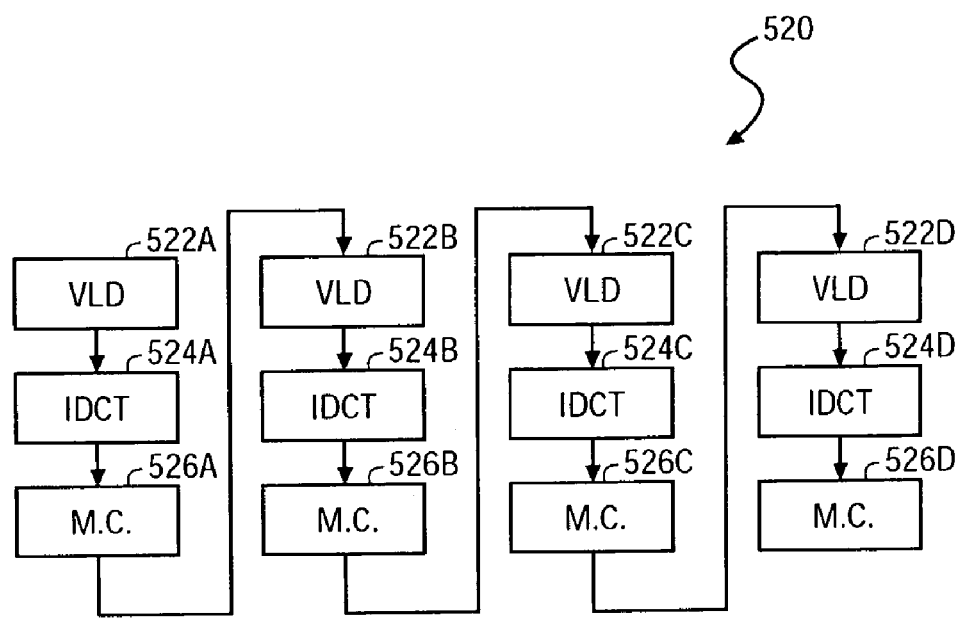
FIG. 9 illustrates method steps for decoding an encoded MPEG video bit stream as known in the art.
Figure 10:
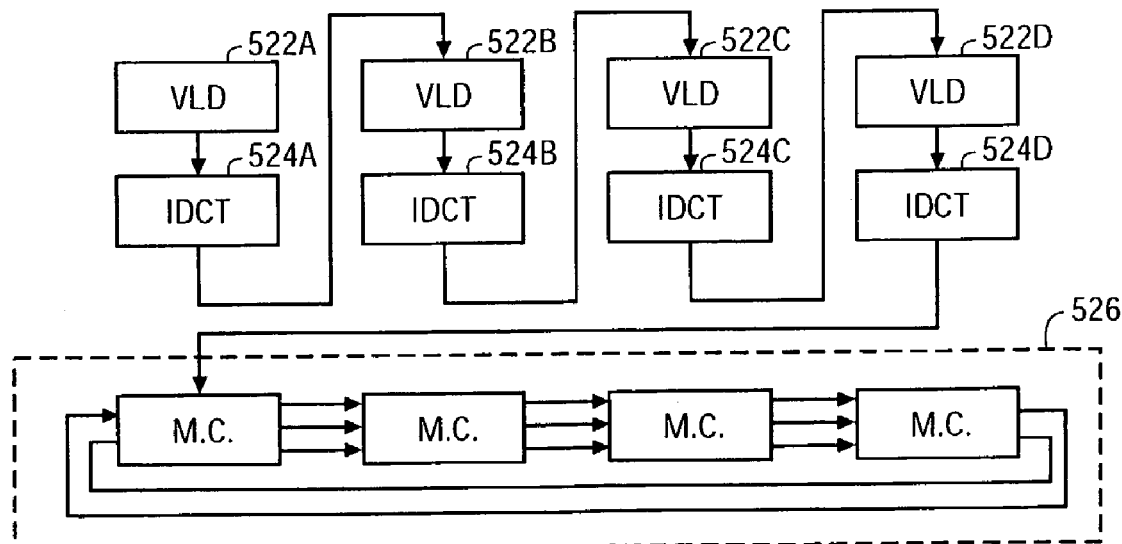
FIG. 10 illustrates method steps for decoding an encoded MPEG video bit stream in accordance with the novel motion compensation technique as taught by the present invention.

FIG. 9 is a block diagram depicting steps for decoding an MPEG bit stream. Instead of motion compensating a block after a block, we propose motion compensation of blocks in groups of four block (as shown in FIG. 10). MPEG video bits streams are generally decoded as follows: (1) VLD the motion vector and the DCT coefficients of a block 522; (2) IQ and IDCT of the DCT coefficients of the block 524; and (3) MC the residue of the block with the displaced reference block 526. One problem of this approach is that it causes many partial writes.

Generally, after a block is MC, the resulting block is written back to the frame buffer. Assuming the video image is stored in a linear fashion and the width of the video is larger than the size of an entry in WC buffer, the resulting marcoblock is written to the frame as follows. As the block is written back to the frame buffer line after line, each eight-byte write starts a new cache line. Thus, after storing four lines, the application is forcing the WC buffer to flush some of its entries. That is, partials writes (16 bytes out of 32 bytes) occur.

However by motion compensating four blocks together, partial writes are eliminated. That is, Step one (522) and Step two (524) are repeated four times before Step three (526) is performed as depicted in FIG. 10. Furthermore, instead of writing out the second line of a first block after the first line of the first block, the first line of a second block is written out. This is because the first line of the first block and the first line of the second block belong to the same cache lines. Consequently, the WC buffer 500 can easily combine the write operations in a burst operation. However, those skilled in the art will recognize that various numbers of blocks may be chose as the plurality of block, such the number of blocks is dependent on the line size of the write combining buffer.

Figures 11A, 11B:
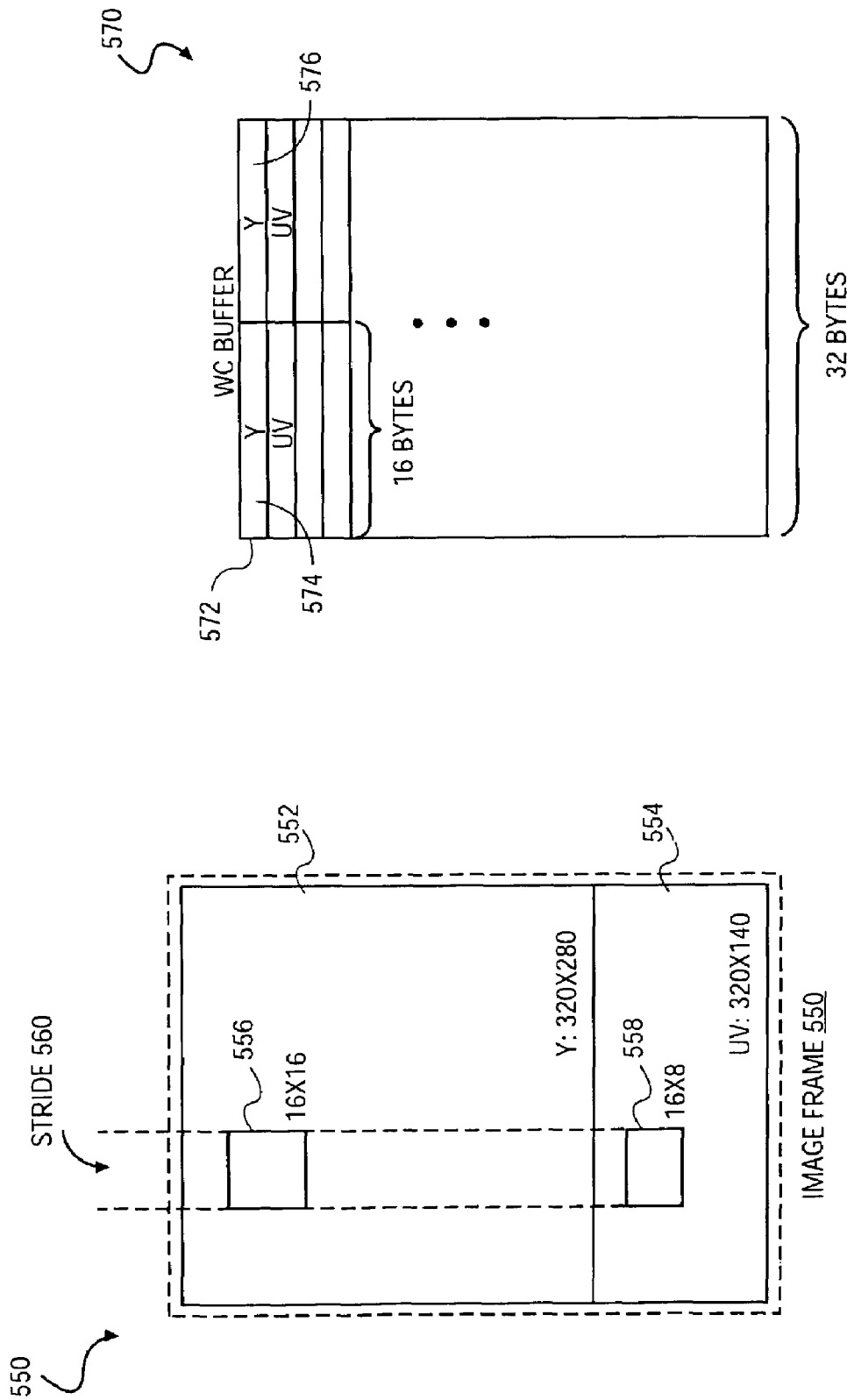
FIG. 11A illustrates a stride of an image frame represented in the mixed storage format as taught by the present invention.
FIG. 11B is a block diagram illustrating a write combining (WC) buffer including a cache line containing a Y-component and a UV component represented in the mixed storage format as taught by the present invention.

The real advantages of writing the data out in a multiple of four blocks comes from using the mixed storage format 300 (FIG. 5C). In this format that, Y components of a video image have the same stride as the UV components of the video image. Referring to FIG. 11A, an image frame 550 is depicted utilizing the mixed storage format 300. The image 550 includes a 320×280 pixel Y-component 552 and a 320×140 pixel UV-component 554. As such a Y-block 556 has an equal stride 560 as a UV-block 558. As a result, whenever we finish writing to a full cache line 572 (thirty-two bytes) of a WC buffer 570 (FIG. 11B), we generate a "full write" of Y-components 574 (thirty-two bytes) and corresponding UV components 576 (thirty-two bytes). We only need four blocks to guarantee a "full-write" of the cache line. That is, we don't need four extra blocks to guarantee a "full-write" of the cache line. This property provides a distinct advantage over previous pure planner YV12 format. Procedural method steps for implementing the inventive mixed storage format 300 (FIG. 5C) and a modified method for decoding an encoded bit stream are now described.

Operation

Figure 12:
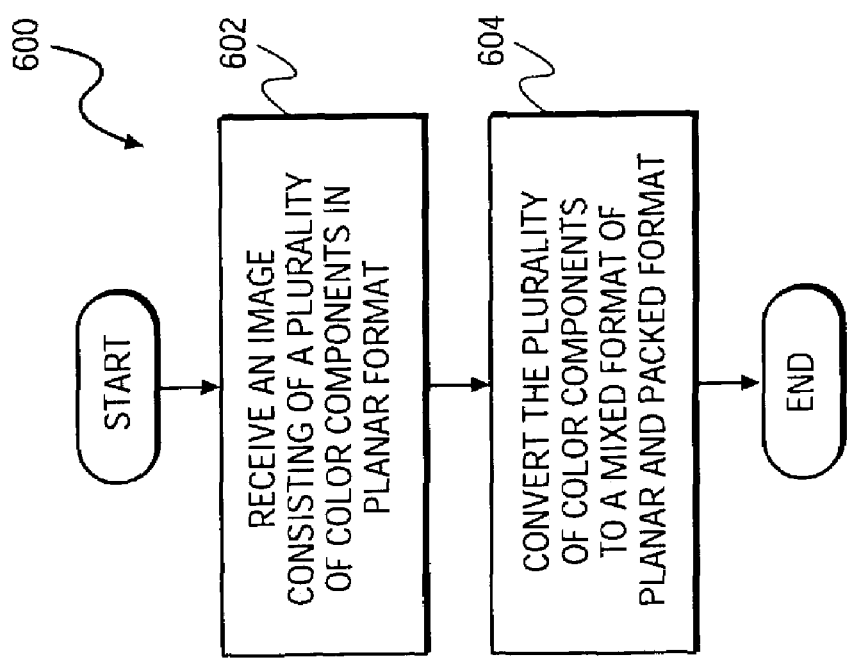
FIG. 12 illustrates method steps for improved memory management of video images utilizing a mixed storage format according to an embodiment of the present invention.

Referring now to FIG. 12, a method 600 is depicted for improved memory management of image data, for example, in the Video Decoder 240 as depicted in FIG. 4. At step 602, an image consisting of a plurality of color components 242 is received. The plurality of color components 242 contained in the image are received in a planar format 304 (FIG. 5B). At step 604, the each of the plurality of color components 242 is converted into a mixed format 300 (FIG. 5C) of planar format 304 and packed format 302. In order to convert the plurality of color components to the mixed format 300, one or more of the plurality of color components 242 are stored in a planar format 304 and one or more of the plurality of color components are stored in a packed format 302.

Figure 13:
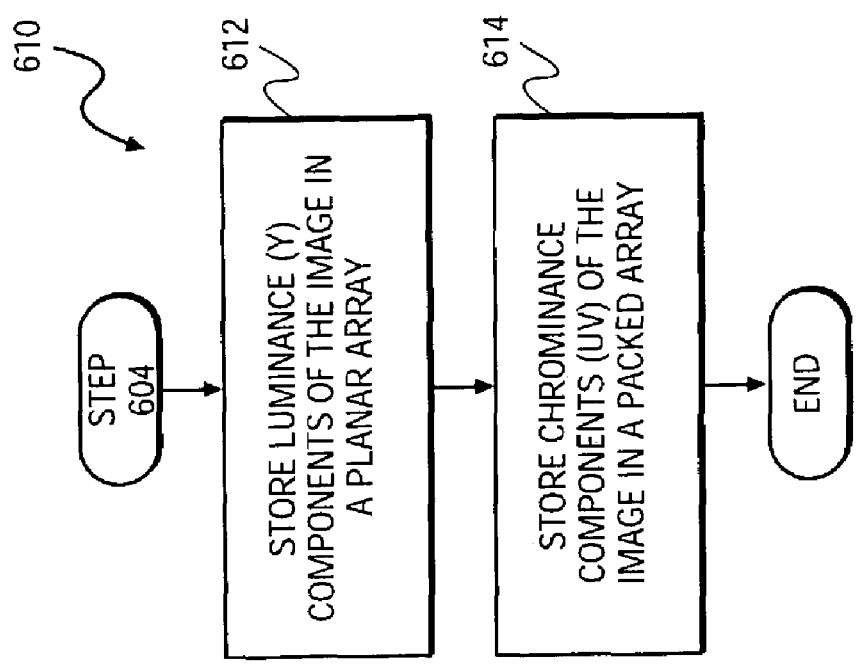
FIG. 13 illustrates additional method steps for improved memory management of video images utilizing a mixed storage format according to a further embodiment of the present invention.

FIG. 13 depicts additional method steps 610 for converting the plurality of color components 242 of step 604, such that the plurality of color components are presented in a YUV color space. At step 612, luminance components (Y) of the image are stored in a planar array 300A (FIG. 5C). At step 614, chrominance components (UV) of the image are stored in a packed array 300B (FIG. 5C). The image is, for example, a video image consisting of a plurality of pixels.

FIG. 14 depicts additional method steps 620 for converting color components 242 in the mixed format 300 into the packed format 302. At step 622, the luminance components (Y) are accessed within the planar array 300A. At step 624, the chominance components (UV) are accessed within the packed array 300B. Finally at step 626, an interleaving write-out of Y components and UV components is performed to a YUV packed array 302. The packed format is, for example, one of YUV2 packed format, UYVY packed format, YUV12 packed format, YUV16 packed format, or YUV9 packed format.

FIG. 15 depicts additional method steps 640 for converting color components 242 stored in the mixed format 300 into the planar format 304. A step 642, a memory copy is performed of the luminance components (Y) within the planar array 300A to a Y-plane 304A of YUV planar arrays 304. At step 644, an alternate read/write-out coping of the UV components is performed into respective planes of the YUV planar arrays 304. In other words, the U components are written to a U-plane 304B of the planar arrays 304 and the V component is written to a V-plane 304B of the planar arrays 304. The planar format is, for example, chosen as one of YV12 planar format, YUV12 planar format, YUV16 planar format, or YUV9 planar format. In addition, color components are presented in a color space chosen as, for example, one of a YUV color space, a YCrCb color space, a YIQ color space, or an RGB color space.

Figure 16:
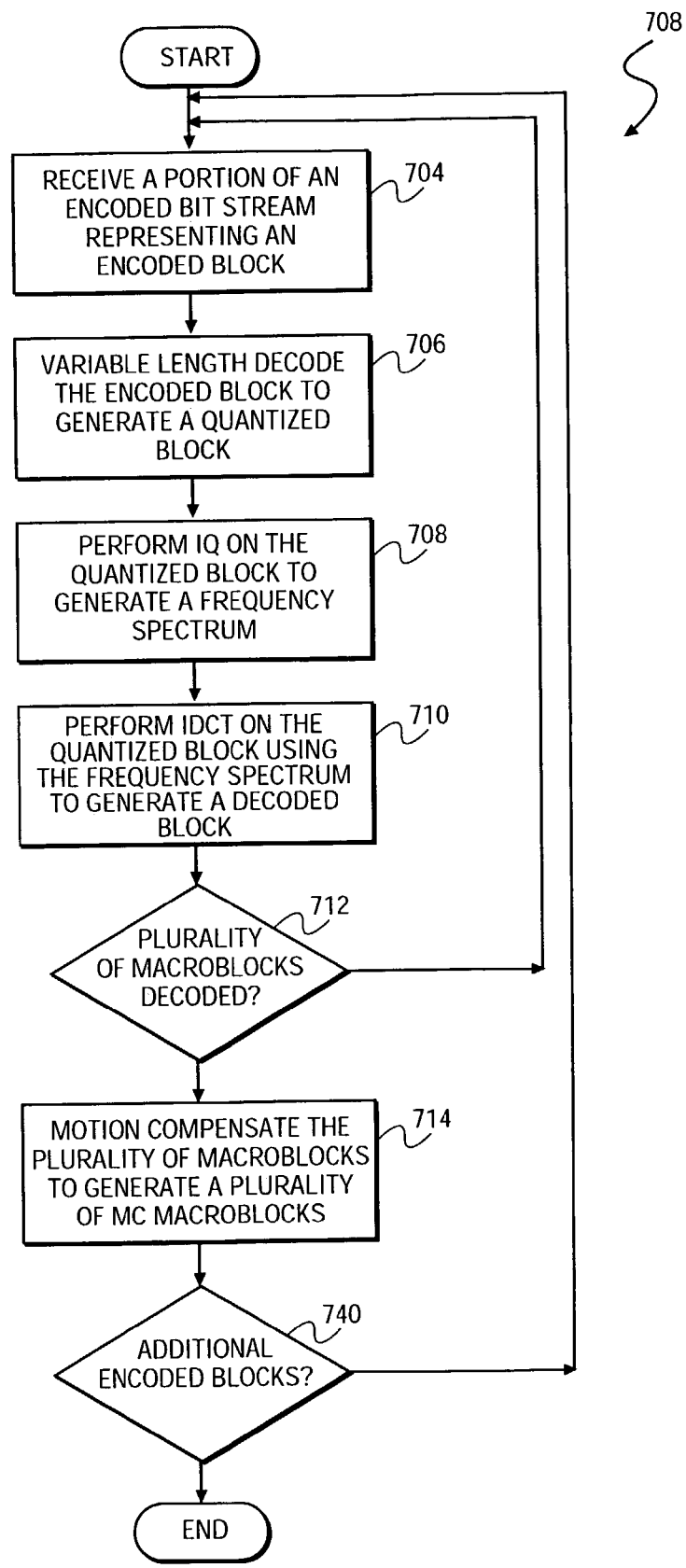
FIG. 16 illustrates method steps for decoding an encoded bit stream according to an embodiment of the present invention.

Referring now to FIG. 16, a method 700 is depicted for decoding an encoded bit stream, for example, in the Video Decoder 240 as depicted in FIG. 4. At step 704, a portion of the encoded bit stream is received representing an encoded block. Alternatively, a quanitized block 246 may be received. At step 706, the encoded block is variable length decoded (VLD) to generate a quantized block. When the quanitized block is received at step 704, step 706 is not performed. Those skilled in the art will appreciate that the encoded block may be decoded in various ways and remain with in the scope of this invention. At step 708, inverse quantization (IQ) is performed on the quantized block to generate a frequency spectrum for the quantized block. At step 710, inverse discrete cosine transformation (IDCT) of the quantized block is performed using the frequency spectrum to generate a decoded block. At step 712, steps 704 through 710 are repeated for a plurality of encoded blocks. As a result, a plurality of decoded blocks, representing a plurality of macroblocks, are formed. At step 714, the plurality of macroblocks are motion compensated as a group in order to generate a plurality of motion compensated (MC) macroblocks. Finally at step 740, steps 704 through 714 are repeated for each encoded block represented by the encoded bit stream. The encoded bit streams is, for example, an encoded MPEG video bit stream.

Figure 17:
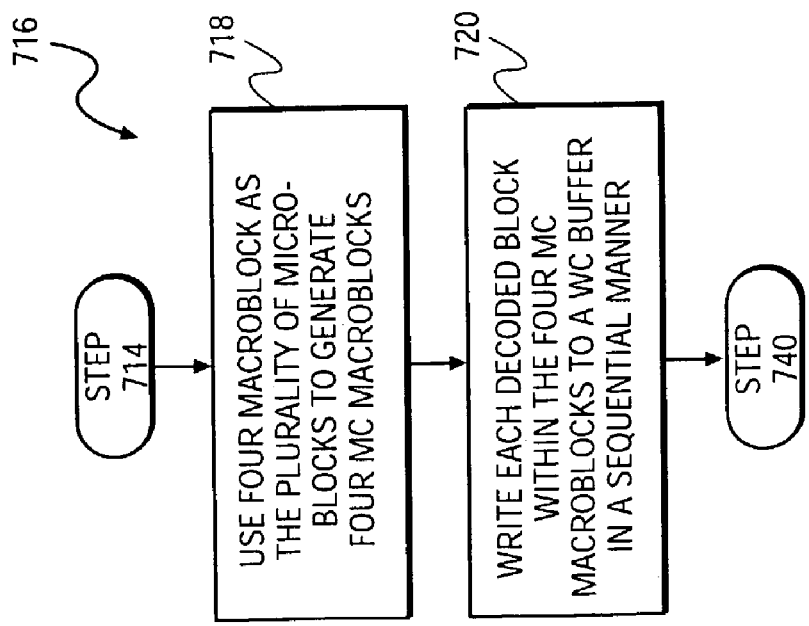
FIG. 17 illustrates additional method steps for decoding an encoded bit stream according to a further embodiment of the present invention.

FIG. 17 depicts additional method steps 716 for motion compensating the plurality of macroblocks of step 714. At step 718, four blocks are used as the plurality of blocks. Finally at step 720, pixel data of the four MC blocks is written as a group and in a sequential manner to a frame buffer, such that prior to being burst written to the frame buffer, the pixel data is temporarily held in an entry of a write-combining (WC) buffer (the first line of a second block is written out after the first line of the first block). As a result, partial writes from the WC buffer are eliminated. The WC buffer is, for example, a four-cache line WC buffer having a thirty-two byte cache line length, however, alternate numbers of cache lines and cache line lengths are within the scope of the present invention.

Figure 18:
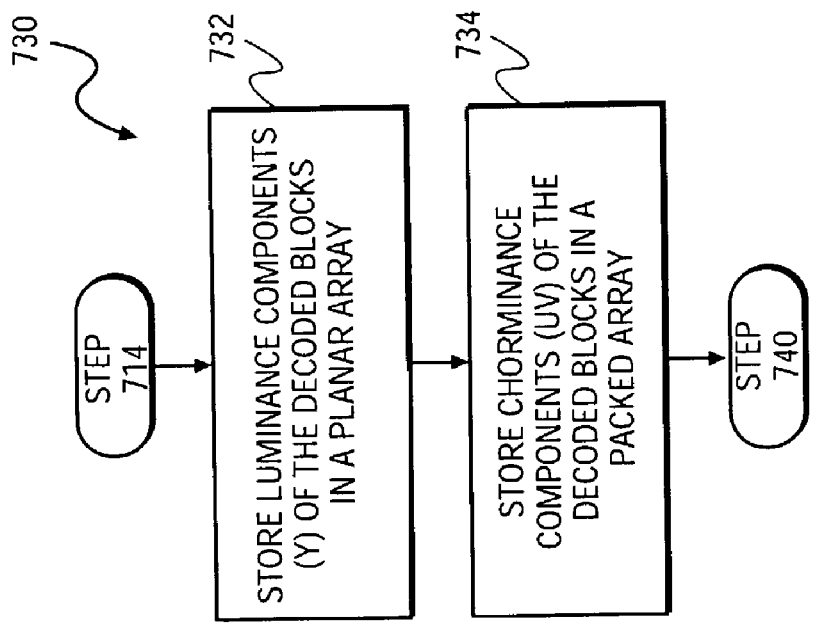
FIG. 18 illustrates additional method steps for decoding an encoded bit stream utilizing a mixed storage format according to a further embodiment of the present invention.

FIG. 18 depicts additional method steps 730 for motion compensating the plurality of macroblocks of step 714, such that the decoded blocks are represented in a YUV color space, planar storage format. At step 732, luminance components (Y) of the decoded blocks are stored in a planar array. Finally at step 734, chrominance components (UV) of the decoded blocks are stored in a packed array. In other words, the decoded blocks are converted into a mixed storage format of planar format and packed format.

The methods described above can be provided in applications (e.g., video/graphic applications) to potentially increase the performance of the applications by decreasing the time to motion compensate decoded blocks. Moreover, applications that include the method as described above, can be stored in memory of a computer system as a set of instructions to be executed. In addition, the instructions to perform the methods as described above could alternatively be stored on other forms of computer-readable medium, including magnetic and optical disks. For example, method of the present invention can be stored on computer-readable mediums, such as magnetic disks or optical disks, that are accessible via a disk drive (or computer-readable medium drive).

Alternatively, the logic to perform the methods as discussed above, could be implemented in additional computer and/or machine readable mediums. Such mediums include discrete hardware components such as large-scale integrated circuits (LSI's), application-specific integrated circuits (ASIC's), firmware such as electrically erasable programmable read-only memory (EEPROM's); and, electrical, optical, acoustical or other forms of propagated signals (e.g., carrier waves, infrared signals, digital signals, etc.)

It is to be understood that even though numerous characteristics and advantages of various embodiments of the present invention have been set forth in the foregoing description, together with details of the structure and function of various embodiment of the invention, this disclosure is illustrative only. Changes may be made in detail, especially matters of structure and management of parts within the principles of the present invention to the full extent indicated by the broad general meaning of the terms in which the appended claims are expressed. For example, the particular element may vary depending on the particular application for the novel mixed storage format while maintaining substantially the same functionality without departing from the scope and spirit of the present invention.

In addition, although the preferred embodiment described herein is directed to a novel mixed storage format for enabling improved memory management of video images, it will be appreciated by those skilled in the art that the teaching of the present invention can be applied to other system. In fact, systems from low-bit-rate Internet based communications to high-bit-rate video broadcasting as well as software/hardware video encoder/decoders are within the teachings of the present invention, without departing from the scope and spirit of the present invention.

Having disclosed exemplary embodiments and the best mode, modifications and variations may be made to the disclosed embodiments while remaining within the scope of the invention as defined by the following claims.

What is claimed is:

1. A method comprising:
   (1) receiving a quantized block of an image;
   (2) performing inverse quantization on the quantized block to generate a frequency spectrum for the quantized block;
   (3) performing inverse discrete cosine transformation of the quantized block using the frequency spectrum to generate a decoded block;
   (4) repeating for a plurality of encoded blocks, such that a plurality (1)-(3) of decoded blocks are formed;
   (5) storing color components of the decoded blocks of the image of a first color component type in a planar format;
   (6) storing color components of the decoded blocks of the image of a second color component type and a third color component type in a packed format, such that the color components of the decoded blocks of the image are stored in a mixed format of planar format and packed format;
   (7) motion compensating the color components of (1)-(3) the decoded blocks as a group in the mixed format of planar format and packed format thereby generating a plurality of motion compensated (MC) blocks and;
   (8) repeating (1)-(7) for each quanitized block of the image.

2. The method of claim 1, where the motion compensating of the plurality of blocks further comprises:
   using as the plurality of blocks four blocks, such that four MC blocks are generated as the plurality of MC blocks; and
   writing pixel data of the four MC blocks as a group and in a sequential manner to a frame buffer, such that prior to being burst written to the frame buffer, the pixel data is temporarily held in an entry of a write-combining (WC) buffer, thereby eliminating partial writes from the WC buffer.

3. The method of claim 1,
   wherein (5) further comprises:
   storing luminance components (Y) of the decoded blocks in a planar array; and
   wherein (6) further comprises:
   storing chrominance components (UV) of the decoded blocks in a packed array, such that the decoded blocks are converted into a mixed storage format of planar format and packed format.

4. A computer-readable medium having stored thereon a set of instructions, the set of instruction, which when executed by a processor, cause the processor to perform a method comprising:
   (1) receiving a quantized block of an image;
   (2) performing inverse quantization on the quantized block to generate a frequency spectrum for the quantized block;
   (3) performing inverse discrete cosine transformation of the quantized block using the frequency spectrum to generate a decoded block;
   (4) repeating (1)-(3) for a plurality of encoded blocks, such that a plurality of decoded blocks are formed;
   (5) storing color components of the decoded blocks the image of a first color component type in a planar format;
   (6) storing color components of the decoded clocks of the image of a second color component type and a third color component type in a packed format, such that the color components of the decoded blocks of the image are stored in a mixed format of planar format and packed format;
   (7) motion compensating the color components of the decoded blocks as a group in the mixed format of planar format and packed format thereby generating a plurality of motion compensated (MC) blocks and;
   (8) repeating (1)-(7) for each quanitized block of the image.

5. The computer-readable medium of claim 4, where the motion compensating of the plurality of blocks further comprises:
   using as the plurality of blocks four blocks, such that four MC blocks are generated as the plurality of MC blocks; and
   writing pixel data of the four MC blocks as a group and in a sequential manner to a frame buffer, such that prior to being burst written to the frame buffer, the pixel data is temporarily held in an entry of a write-combining (WC) buffer, thereby eliminating partial writes from the WC buffer.

6. The computer-readable medium of claim 4, wherein (5) further comprises:
   storing luminance components (Y) of the decoded blocks in a planar array; and
   wherein (6) further comprises:
   storing chrominance components (UV) of the decoded blocks in a packed array, such that the decoded blocks are converted into a mixed storage format of planar format and packed format.

* * * * *